United States Patent
Fujii et al.

(10) Patent No.: US 10,921,940 B2
(45) Date of Patent: Feb. 16, 2021

(54) TOUCH SENSOR

(71) Applicant: PANASONIC INTELLECTUAL PROPERTY MANAGEMENT CO., LTD., Osaka (JP)

(72) Inventors: Shoji Fujii, Osaka (JP); Hirofumi Komiya, Osaka (JP); Keisyu Muraoka, Osaka (JP); Keishiro Murata, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/492,923

(22) PCT Filed: Feb. 22, 2018

(86) PCT No.: PCT/JP2018/006560
§ 371 (c)(1),
(2) Date: Sep. 10, 2019

(87) PCT Pub. No.: WO2018/168388
PCT Pub. Date: Sep. 20, 2018

(65) Prior Publication Data
US 2020/0019261 A1     Jan. 16, 2020

(30) Foreign Application Priority Data
Mar. 14, 2017  (JP) ................................ 2017-048085

(51) Int. Cl.
*G06F 3/044* (2006.01)
*B32B 7/12* (2006.01)
*B32B 17/10* (2006.01)

(52) U.S. Cl.
CPC ................ *G06F 3/044* (2013.01); *B32B 7/12* (2013.01); *B32B 17/10761* (2013.01); *B32B 2457/208* (2013.01)

(58) Field of Classification Search
CPC . G06F 3/044; G06F 3/041; B32B 7/12; B32B 17/10; B32B 17/10761; B32B 27/28; B32B 27/30; H03K 17/962
See application file for complete search history.

(56) References Cited

U.S. PATENT DOCUMENTS

| | | | |
|---|---|---|---|
| 9,454,179 B2 | 9/2016 | Shin et al. | |
| 9,731,479 B2* | 8/2017 | Uriu | B32B 37/1207 |

(Continued)

FOREIGN PATENT DOCUMENTS

| | | |
|---|---|---|
| JP | 2012-043165 A | 3/2012 |
| JP | 2013-182549 A | 9/2013 |

(Continued)

OTHER PUBLICATIONS

International Search Report dated Mar. 27, 2018 in International Patent Application No. PCT/JP2018/006560; with English translation.

(Continued)

*Primary Examiner* — Sardis F Azongha
(74) *Attorney, Agent, or Firm* — McDermott Will and Emery LLP

(57) ABSTRACT

In a touch sensor in which a touch sensor body is attached to a cover member, the cover member includes: a first member made of a glass plate and having a first surface and a second surface that is an opposite surface of the first member from the first surface; and a resin film made of polyvinyl butyral (PVB) and formed on the second surface. The resin film is located between the first member and the touch sensor body.

10 Claims, 1 Drawing Sheet

(56) References Cited

U.S. PATENT DOCUMENTS

| | | | |
|---|---|---|---|
| 10,019,116 B2* | 7/2018 | Uriu | G06F 3/044 |
| 10,399,310 B2* | 9/2019 | Nodono | C08J 7/042 |
| 2012/0280368 A1* | 11/2012 | Garner | B32B 17/10036 |
| | | | 257/629 |
| 2013/0228441 A1 | 9/2013 | Santo et al. | |
| 2015/0097389 A1 | 4/2015 | Dryselius et al. | |
| 2015/0174861 A1* | 6/2015 | Hasegawa | B32B 17/10678 |
| | | | 428/337 |
| 2015/0378477 A1* | 12/2015 | Yoshiki | G06F 1/1637 |
| | | | 345/174 |
| 2016/0202842 A1 | 7/2016 | Uriu et al. | |
| 2016/0266692 A1 | 9/2016 | Park | |
| 2016/0334897 A1 | 11/2016 | Nakamura et al. | |
| 2016/0352031 A1 | 12/2016 | Ito | |
| 2017/0087807 A1* | 3/2017 | Lee | B32B 7/12 |
| 2017/0205927 A1 | 7/2017 | Lee et al. | |

FOREIGN PATENT DOCUMENTS

| | | |
|---|---|---|
| JP | 2015-092422 A | 5/2015 |
| JP | 2015-141581 A | 8/2015 |
| JP | 2015-179327 A | 10/2015 |
| WO | 2013/099726 A1 | 7/2013 |
| WO | 2013/111672 A1 | 8/2013 |
| WO | 2015/029350 A1 | 3/2015 |
| WO | 2016/098181 A1 | 6/2016 |

OTHER PUBLICATIONS

International Search Report dated May 15, 2018 in International Patent Application No. PCT/JP2018/006559; with English translation.

Non-Final Office Action issued in U.S. Appl. No. 16/492,896, dated Jun. 24, 2020.

\* cited by examiner

TOUCH SENSOR

CROSS-REFERENCE OF RELATED APPLICATIONS

This application is the U.S. National Phase under 35 U.S.C. § 371 of International Patent Application No. PCT/JP2018/006560, filed on Feb. 22, 2018, which in turn claims the benefit of Japanese Application No. 2017-048085, filed on Mar. 14, 2017, the entire disclosures of which Applications are incorporated by reference herein.

TECHNICAL FIELD

The present invention relates to touch sensors that are used for input operation units of various electronic devices.

BACKGROUND ART

Electronic devices have an input operation unit. The input operation unit is configured by disposing a touch sensor in front of a display device. The touch sensor is configured by bonding a capacitive touch sensor body to a resin or glass cover member.

CITATION LIST

Patent Documents

PATENT DOCUMENT 1: Japanese Unexamined Patent Publication No. 2013-182549

SUMMARY OF THE INVENTION

Technical Problem

In touch sensors having a cover member made of a glass plate, it is necessary to restrain scattering of broken glass pieces in case the cover member breaks.

The present invention was developed to solve this problem and it is an object of the present invention to provide a touch sensor having a cover member made of a glass plate and capable of restraining scattering of broken glass pieces in case the cover member breaks.

Solution of the Problem

In order to achieve the above object, the present invention provides a touch sensor in which a touch sensor body is attached to a cover member. The cover member includes a first member made of a glass plate and having a first surface and a second surface that is an opposite surface of the first member from the first surface, and a resin film made of polyvinyl butyral or an ethylene-vinyl acetate copolymer and formed on the second surface. The resin film is located between the first member and the touch sensor body.

With this configuration, a touch sensor can be provided in which the cover member includes the first member made of a glass plate and which can restrain scattering of broken glass pieces in case the first member breaks.

Advantages of the Invention

As described above, the present invention thus provides a touch sensor in which a cover member includes a glass plate member and which can restrain scattering of broken glass pieces in case the glass plate member breaks.

DESCRIPTION OF EMBODIMENTS

Touch sensors according to embodiments will be described with reference to the accompanying drawings.

First Embodiment

Figure 1:
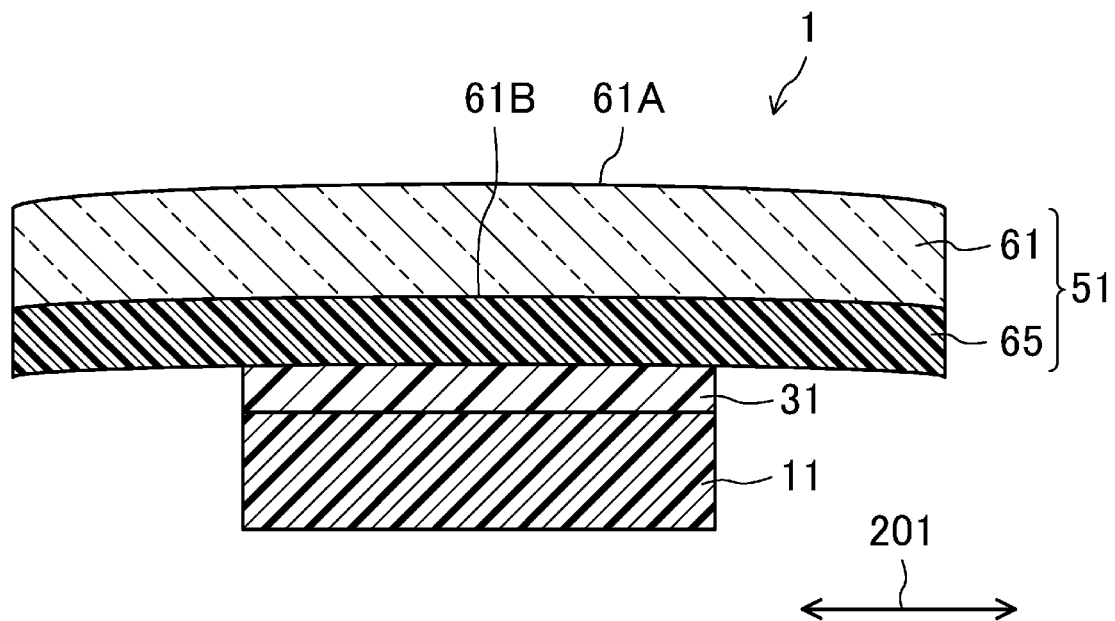
FIG. 1 is a sectional view of a touch sensor according to a first embodiment of the present invention.

FIG. 1 is a sectional view of a touch sensor according to a first embodiment of the present invention.

As shown in FIG. 1, a capacitive touch sensor 1 includes a touch sensor body 11 and a cover member 51. The touch sensor 1 is transparent.

The cover member 51 is transparent and includes a first member 61 made of a curved glass plate and a resin film 65. The first member 61 is transparent. The first member 61 has a first surface 61A and a second surface 61B that is the opposite surface of the first member 61 from the first surface 61A. The first surface 61A serves as what is called an operation surface. The resin film 65, which is transparent, is formed on the entire second surface 61B. The resin film 65 is made of polyvinyl butyral (PVB) or an ethylene-vinyl acetate copolymer (EVA). The touch sensor body 11 is attached to the opposite outer surface of the resin film 65 from the second surface 61B via a transparent adhesive 31. The touch sensor body 11 includes a sensor electrode capable of detecting a change in capacitance and the adhesive 31 for bonding the touch sensor body 11 to the cover member 51. The touch sensor body 11 may be directly attached to the resin film 65. In other words, the touch sensor 1 is configured so that the resin film 65 is disposed between the first member 61 and the touch sensor body 11. As shown in FIG. 1, the cover member 51 is larger than that of the touch sensor body 11 as viewed in plan. The periphery of the resin film 65 which is located outside the touch sensor body 11 is therefore exposed. A thin cover member 51 can be formed when a glass plate with a thickness of 0.7 mm or more is used as the first member 61. In the case where the cover member 21 is adapted to the touch sensor body 11 designed for large screens of 25 inches or larger, it is desirable to use a rather thick glass plate as the first member 61 so as not to cause large deflection. However, in order to easily produce the curved shape of the first member 61, it is desirable that the first member 61 have a thickness of 2.5 mm or less.

The first surface 61A of the first member 61 serves as an operation surface. This configuration provides high operability as the user does not feel his/her finger sinking in during touch operation with his/her finger and can smoothly move his/her finger on the operation surface, etc.

The resin film 65 is transparent and is in close contact with the second surface 61B. The resin film 65 is formed with a uniform thickness. When the resin film 65 has a thickness of, e.g., 0.1 mm or more, scattering of broken glass pieces will hardly occur in case the first member 61 breaks. Especially when the resin film 65 has a thickness of 0.3 mm or more, it is easy to form the resin film 65. The upper limit of the thickness of the resin film 65 is not particularly limited. However, the thickness of the resin film 65 is basically, e.g., about 0.8 mm or less as there is also a high demand for a thin cover member 51. In the case where a thick first member 61 is used in large screen applications etc., the thickness of the resin film 65 is basically about 1.5 mm or less. It is desirable that the resin film 65 be in direct close contact with the first member 61. The resin film 65 may be stacked on and bonded to the first member 61 with an adhesive.

A part of the outer surface of the resin film 65 to which the touch sensor body 11 is bonded is curved in a spherical shape or a tunnel shape according to the shape of the second surface 61B of the curved first member 61. The tunnel shape refers to such a shape that the second surface 61B is curved with a predetermined R value in a first direction 201 and is straight in a second direction perpendicular to the first direction 201 (the direction perpendicular to the plane of paper in FIG. 1). In the case of the tunnel shape, the predetermined R value in the first direction 201 is a curvature R of, e.g., 50 mm or more and 1,000 mm or less. With this curvature, the touch sensor body 11 can be attached to the cover member 51. In the case of the spherical shape as well, it is desirable that the curvature R be 50 mm or more and 1,000 mm or less. With this curvature, the first member 21 itself can also be formed, and air bubbles can be restrained from entering between the first member 21 and the resin film 65.

The curvature of the second surface 61B may vary between the portion to which the touch sensor body 11 is attached and the outer end of the second surface 61B. The curvature of the second surface 61B is not particularly limited as long as the resin film 65 can be in close contact with the second surface 61B.

The touch sensor 1 is configured in this manner. The touch sensor 1 is disposed in front of a display device when mounted on an electronic device. User's touch operation on the operation surface of the touch sensor 1 causes a change in capacitance of the sensor electrode, and this change is detected through the sensor electrode. The operation position is thus specified, and predetermined control of the electronic device is performed.

In the cover member 51 of the touch sensor 1, the resin film 65 is in close contact with the second surface 61B of the first member 61 made of a glass plate. The resin film 65 is made of polyvinyl butyral or an ethylene-vinyl acetate copolymer. This configuration restrains scattering of broken glass pieces even if the first member 61 breaks.

The sensor electrode in the touch sensor body 11 may be what is called a transparent electrode made of ITO etc. or may be opaque conductive thin metal wires arranged in a mesh pattern, etc. The sensor electrode is not particularly limited. A base material on which the sensor electrode is disposed is a resin film, a glass, a resin mold, etc. The number of base materials is one or more. In the case where two base materials are used, the base materials are bonded together with a transparent adhesive.

The adhesive 31 for bonding the touch sensor body 11 to the cover member 51 may be comprised of polyvinyl butyral (PVB) or an ethylene-vinyl acetate copolymer (EVA).

Second Embodiment

Figure 2:
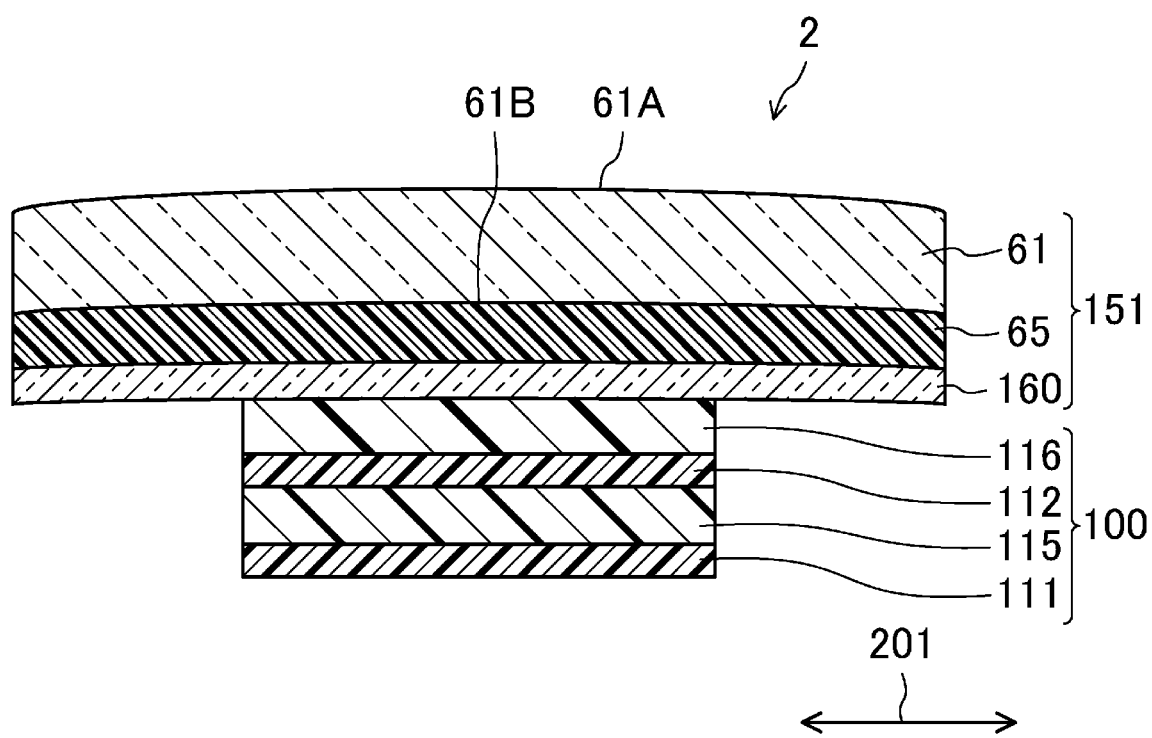
FIG. 2 is a sectional view of a touch sensor according to a second embodiment of the present invention.

FIG. 2 is a sectional view of a touch sensor according to a second embodiment of the present invention.

A touch sensor 2 according to the second embodiment includes a touch sensor body 100 and a cover member 151.

The cover member 151 includes a first member 61 made of a curved glass plate, a resin film 65, and a second member 160. The first member 61 and the resin film 65 are the same as those of the cover member 51. That is, a second surface 61B of the first member 61 is curved, and the resin film 65 has a substantially uniform thickness and is in close contact with the second surface 61B. Accordingly, the opposite outer surface of the resin film 65 from the second surface 61B is also curved. The second member 160 is in close contact with the resin film 65 along the curved outer surface of the resin film 65. The second member 160 is flexible and is disposed so as to conform to the curved outer surface of the resin film 65.

The second member 160 is made of, e.g., a flexible thin glass plate. In terms of weight reduction etc., a glass plate with a thickness of 0.01 mm or more and 0.55 mm or less is used as the second member 160. In the case where a cover member 151 of 25-inch or larger size is formed, a glass plate with a thickness of 0.01 mm or more and 1.85 mm or less is used as the second member 160. In the case where a glass plate with such a thickness is used as the second member 160, the second member 160 can be easily disposed so as to conform to the curved outer surface of the resin film 65, and air bubbles etc. can be restrained from being trapped between the resin film 65 and the second member 160. In order to restrain an increase in overall thickness of the cover member 151, the second member 160 can be made thinner than the first member 61.

As described above, the cover member 151 is formed by disposing the first member 61 made of a glass plate and the second member 160 made of a glass member with the resin film 65 interposed therebetween.

The touch sensor body 100 is attached to the outer surface of the second member 160. FIG. 2 shows the touch sensor body 100 comprised of two substrates stacked on top of each other. The touch sensor body 100 will be briefly described. The touch sensor body 100 has a first substrate 111 and a second substrate 112. The first substrate 111 and the second substrate 112 are transparent and are made of, e.g., a resin film or a glass plate. A transmitting electrode of a sensor electrode is disposed on the first substrate 111, and a receiving electrode of the sensor electrode is disposed on the second substrate 112. The first substrate 111 is bonded to the second substrate 112 with a transparent adhesive 115. A transparent adhesive 116 that is used to bond the second substrate 112 to the cover member 151 is applied to the second substrate 112. The touch sensor body 100 is attached to the outer surface of the second member 160 via the adhesive 116.

As shown in FIG. 2, the outer surface of the second member 160 is curved with a predetermined R value in a first direction 201 and is straight in a second direction perpendicular to the first direction 201 (the direction perpendicular to the plane of paper in FIG. 2). In the case where the outer surface of the second member 160 has this tunnel shape, as described above, the touch sensor body 11 can be attached to the cover member 151 when the predetermined R value in the first direction 201 is a curvature R of, e.g., 50 mm or more and 1,000 mm or less. In this case, air bubbles can be restrained from entering between the second member 160 and the resin film 65. As described above, the outer surface of the second member 160 may have a spherical shape with a curvature R of 50 mm more and 1,000 mm or less.

The touch sensor 2 is configured in this manner.

The cover member 151 of the touch sensor 2 has a first surface 61A of the first member 61 as an operation surface. This cover member 151 further restrains scattering of broken glass pieces in case the first member 61 breaks, as compared to the cover member 51 described above. That is, the cover member 151 has the second member 160 disposed so as to conform to the resin film 65, and the resin film 65 is held by the second member 160. Scattering of broken glass pieces is therefore further restrained.

The second member 160 is not limited to the flexible glass plate. For example, the second member 160 may be a resin film. In the case where a resin film is used as the second member 160, a resin film having an elastic modulus similar to that of the flexible glass plate is used as the second member 160. Glass plates typically have an elastic modulus of about 60 GPa to 150 GPa, and glass plates with an elastic modulus of less than 80 GPa are also commonly used. It is desirable that a resin film used as the second member 160 be made of an optically isotropic material. For example, a resin film of one of a cycloolefin polymer (COP), a cyclic olefin copolymer (COC), a polycarbonate (PC), and triacetyl cellulose (TAC) is used. In this case, the resin film has an elastic modulus of less than 80 GPa when the thickness of the resin film is 0.03 mm or more and 1.85 mm or less. In this case as well, in order to produce a thin cover member 151, it is desirable that the second member 160 be thinner than the first member 61. Although the resin film is described above, a plate-like resin member may be used based on the same idea. Alternatively, a biaxially oriented PET film etc. may be used as the second member 160.

When the second member 160 is made of a glass plate, the touch sensor body 100 may be attached to the first surface 61A of the first member 61 and the outer surface of the second member 160 may serve as an operation surface. This configuration also provides satisfactory operability as the user touches the glass surface with his/her finger for touch operation.

Instead of attaching the touch sensor body 100 to the cover member 151, the sensor electrode etc. may be disposed on the second member 160 of the cover member 151. This configuration reduces the number of components and the thickness.

The adhesive 115 and the adhesive 116 for the touch sensor body 100 may be comprised of polyvinyl butyral (PVB) or an ethylene-vinyl acetate copolymer (EVA).

In the above description, both cover members 51, 151 have a curved shape. However, the cover members 51, 151 may not be curved.

In the above description, the resin film 65 of each cover member 51, 151 is made of polyvinyl butyral or an ethylene-vinyl acetate copolymer. The resin film 65 may be made of polyvinyl butyral containing a UV absorber or an ethylene-vinyl acetate copolymer containing a UV absorber. With this configuration, the resin film 65 absorbs a part of UV light entering on the cover member 51, 151 from outside. That is, this configuration reduces transmission of UV light through the resin film 65 to the touch sensor body 11, 100. Accordingly, the touch sensor body 11, 100 is less degraded by UV light. For the cover member 51, a decorative portion is less degraded by UV light in the case where the decorative portion is provided on the opposite surface of the resin film 65 from the second surface 61B. For the cover member 151, a decorative portion is less degraded by UV light in the case where the decorative portion is provided on the opposite surface of the resin film 65 from the second surface 61B or on the second member 160. Similar effects can be expected by tinting the resin film 65. Examples of the tint includes dark tints such as black and gray, a brown tint, and a half mirror tint. The tinted resin film 65 reduces the overall amount of external incident light and thus reduces the influence of transmitted light on the touch sensor body 11, 100.

INDUSTRIAL APPLICABILITY

The present invention provides a touch sensor in which a cover member includes a glass plate member and which restrains scattering of broken glass pieces in case the glass plate member breaks. This touch sensor is useful for various electronic devices.

DESCRIPTION OF REFERENCE CHARACTERS 1, 2 Touch Sensor
11, 100 Touch Sensor Body
31, 115, 116 Adhesive
51, 151 Cover Member
61 First Member
61A First Surface
61B Second Surface
65 Resin Film
111 First Substrate
112 Second Substrate
160 Second Member
201 First Direction

The invention claimed is:

1. A touch sensor comprising:
a touch sensor body; and
a cover member attached to the touch sensor body, characterized in that
the cover member includes a first member made of a glass plate and having a first surface and a second surface that is an opposite surface of the first member from the first surface, and a resin film made of polyvinyl butyral or an ethylene-vinyl acetate copolymer and formed on the entire second surface,
the resin film is provided with an adhesive on an outer surface opposite from a surface facing the second surface, the adhesive being for bonding and having a plan view that is the same as a plan view of the touch sensor body,
the first member and the resin film each have a plan view larger than the plan view of the touch sensor body, and a periphery located outside of a perimeter of the touch sensor body and exposed, and
the cover member is configured such that the resin film is located between the first member and the touch sensor body via the adhesive.

2. The touch sensor of claim 1, wherein the first member has a thickness of 0.7 mm or more and 2.5 mm or less.

3. The touch sensor of claim 1, wherein the cover member has a curved shape and further includes a flexible second member disposed so as to conform to an outer surface of the curved resin film.

4. The touch sensor of claim 3, wherein the second member is made of a flexible glass plate.

5. The touch sensor of claim 4, wherein the second member is thinner than the first member and has a thickness of 0.01 mm or more and 1.85 mm or less.

6. The touch sensor of claim 4, wherein an outer surface of the second member has a curvature R of 50 mm or more and 1,000 mm or less.

7. The touch sensor of claim 4, wherein the second member is made of a resin having an elastic modulus of less than 80 GPa.

8. The touch sensor of claim 7, wherein the second member is made of one of a cycloolefin polymer (COP), a cyclic olefin copolymer (COC), a polycarbonate (PC), and triacetyl cellulose (TAC) and has a thickness of 0.03 m or more and 1.85 mm or less.

9. The touch sensor of claim 4, wherein the touch sensor body is configured by disposing a sensor electrode on the second member.

10. The touch sensor of claim 1, wherein the resin film further contains a UV absorbent.

\* \* \* \* \*